US010764511B1

(12) United States Patent
Peterson et al.

(10) Patent No.: US 10,764,511 B1
(45) Date of Patent: Sep. 1, 2020

(54) IMAGE VERSION SELECTION BASED ON DEVICE ORIENTATION

(71) Applicant: Lenovo (Singapore) Pte. Ltd., Singapore (SG)

(72) Inventors: Nathan J. Peterson, Oxford, NC (US); Russell Speight VanBlon, Raleigh, NC (US); John Carl Mese, Cary, NC (US); Arnold S. Weksler, Raleigh, NC (US); Mark Patrick Delaney, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/366,681

(22) Filed: Mar. 27, 2019

(51) Int. Cl.
*H04N 5/222* (2006.01)
*H04N 5/262* (2006.01)
*H04N 5/232* (2006.01)
*H04N 5/225* (2006.01)

(52) U.S. Cl.
CPC ......... *H04N 5/2628* (2013.01); *H04N 5/2258* (2013.01); *H04N 5/23293* (2013.01)

(58) Field of Classification Search
CPC ......... H04N 5/23293; H04N 5/232933; H04N 5/232935; H04N 5/232945; G06T 3/60
See application file for complete search history.

(56) References Cited

U.S. PATENT DOCUMENTS

| 2012/0057064 A1* | 3/2012 | Gardiner | G06F 1/1626 348/333.12 |
| 2013/0342650 A1* | 12/2013 | Shaw | H04N 13/296 348/46 |
| 2014/0098197 A1* | 4/2014 | Geris | H04N 13/296 348/48 |
| 2014/0118597 A1* | 5/2014 | Tabak | H04N 5/23293 348/333.02 |
| 2014/0240576 A1* | 8/2014 | Chun | H04N 5/23216 348/333.03 |
| 2015/0109408 A1* | 4/2015 | Sharma | H04N 5/23296 348/39 |
| 2018/0096460 A1* | 4/2018 | Tripp | G06F 1/1684 |
| 2018/0376045 A1* | 12/2018 | Weckel | H04N 5/2329 |
| 2019/0253541 A1* | 8/2019 | Fan | G06F 1/1686 |

* cited by examiner

*Primary Examiner* — Kelly L Jerabek
(74) *Attorney, Agent, or Firm* — Ference & Associates LLC

(57) ABSTRACT

One embodiment provides a method, including: capturing, using a first camera of an information handling device, a first image of an area, wherein the first image is associated with a first capture orientation; capturing, using a second camera of the information handling device, a second image of the area, wherein the second image is associated with a second capture orientation; determining, using a processor, whether the first capture orientation or the second capture orientation corresponds to a viewing orientation of the information handling device; and displaying, responsive to the determining, one of the first image or the second image. Other aspects are described and claimed.

20 Claims, 6 Drawing Sheets

IMAGE VERSION SELECTION BASED ON DEVICE ORIENTATION

BACKGROUND

Users may be able to utilize information handling devices ("devices"), for example smart phones, tablets, digital assistants, other electronic devices, and the like, to capture different types of digital media, such as pictures and videos. The digital media may be captured and displayed either horizontally or vertically (i.e., in landscape mode or portrait mode). A user may be able to adjust an orientation of capture and/or display (e.g., from horizontal to vertical, etc.) by, for example, turning a device on its side.

BRIEF SUMMARY

In summary, one aspect provides a method, comprising: capturing, using a first camera of an information handling device, a first image of an area, wherein the first image is associated with a first capture orientation; capturing, using a second camera of the information handling device, a second image of the area, wherein the second image is associated with a second capture orientation; determining, using a processor, whether the first capture orientation or the second capture orientation corresponds to a viewing orientation of the information handling device; and displaying, responsive to the determining, one of the first image or the second image.

Another aspect provides an information handling device, comprising: a processor; a first camera; a second camera; a memory device that stores instructions executable by the processor to: capture, using the first camera, a first image of an area, wherein the first image is associated with a first capture orientation; capture, using the second camera, a second image of the area, wherein the second image is associated with a second capture orientation; determine whether the first capture orientation or the second capture orientation corresponds to a viewing orientation of the information handling device; and display, responsive to the determining, one of the first image or the second image.

A further aspect provides a product, comprising: a storage device that stores code, the code being executable by a processor and comprising: code that instructs a first camera to capture a first image of an area, wherein the first image is associated with a first capture orientation; code that instructs a second camera to capture a second image of the area, wherein the second image is associated with a second capture orientation; code that determines whether the first capture orientation or the second capture orientation corresponds to a viewing orientation of an information handling device; and code that displays, responsive to the determining, one of the first image or the second image.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When capturing or viewing images (e.g., static images, dynamic images, etc.) on a display screen of a device, users oftentimes find that they need to adjust a viewing orientation of the device to optimize the size and/or visual clarity of the image. As an example, with reference to FIG. 6A, an image may be captured horizontally (e.g., in landscape mode, etc.) and displayed on a smart phone in a vertical orientation (e.g., a smart phone oriented in portrait mode, etc.). In this situation, the image may run across the center of the vertical screen, resulting in large areas of black, or "dead", space above and below the image.

Figure 6B:
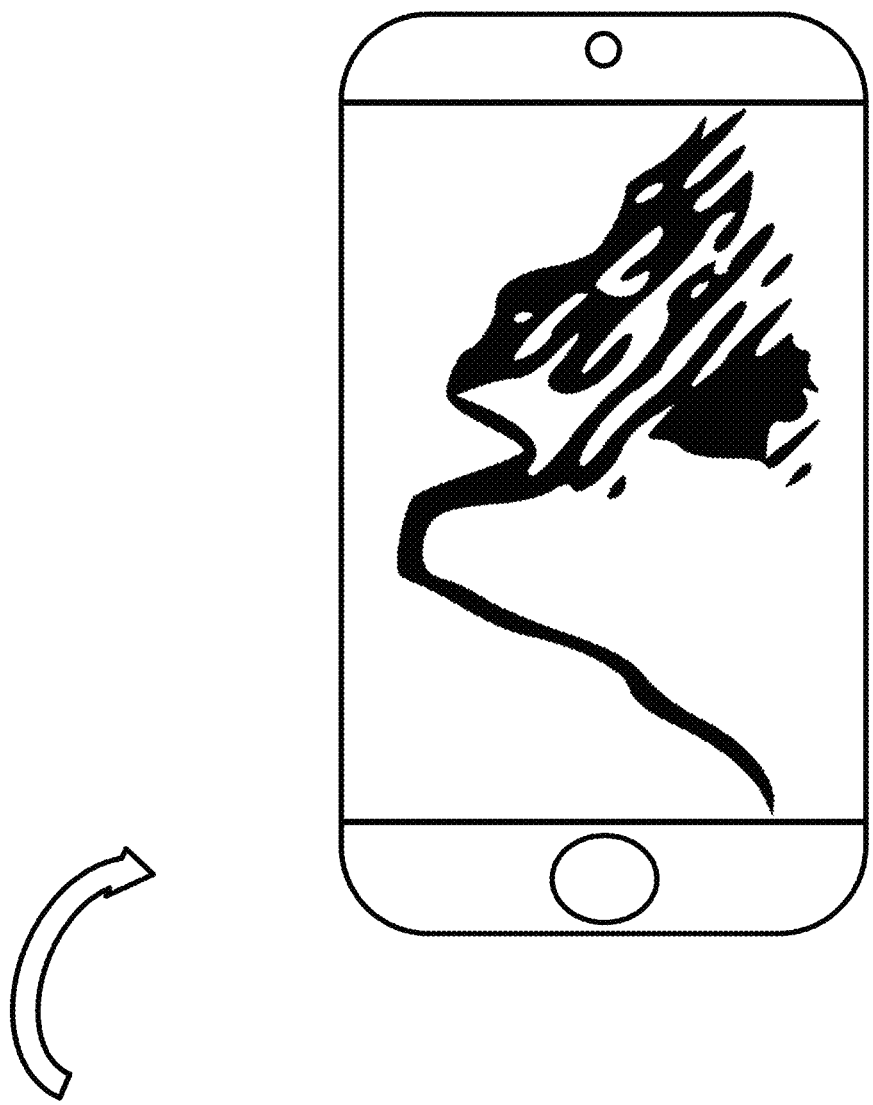
FIG. 6 (A-B) illustrates a conventional method for adjusting a viewing orientation.
Figure 6A:
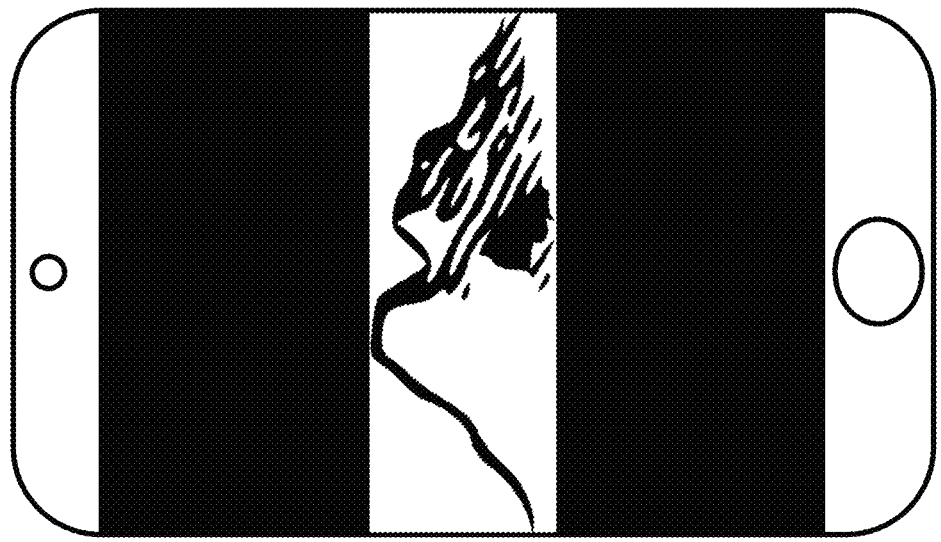

On mobile devices, the above issue may be remedied by rotating the device 90 degrees to the side. Such a maneuver may allow the image to fill the entirety of the display screen, thereby eliminating any pre-existing dead space, as illustrated in FIG. 6B. On laptops or personal computers, a user may not be able to easily rotate their device, accordingly, to remedy the foregoing issue a user may be required to navigate a series of toolbars and/or menus to manually rotate the viewing orientation of the image. In both of these situations, although the viewing orientation may be adjusted to a more optimal viewing orientation, frequent and/or continuous adjustment may be burdensome, frustrating, and potentially time-consuming to the user.

Accordingly, an embodiment provides a method for dynamically displaying a version of an image that best corresponds with a viewing orientation of a device. A device according to the embodiments may comprise two cameras, wherein one of the cameras may comprise a different capture orientation than the other camera (e.g., one camera may be oriented perpendicular to the other camera, etc.). In an embodiment, a first image of an area may be captured by the first camera and a second image of the same area may be captured by the second camera. For example, the first image may be captured in landscape mode whereas the second image may be captured in portrait mode. An embodiment may then identify a viewing orientation of the device and thereafter display either the first or second version of the image based upon the viewing orientation. For example, a user viewing content on a device situated in a vertical orientation may be presented with the second image (i.e., the image captured in portrait mode). Such a method may therefore allow a user to automatically be provided with the image that is best suited for their current viewing orientation.

The illustrated example embodiments will be best understood by reference to the figures. The following description is intended only by way of example, and simply illustrates certain example embodiments.

Figure 1:
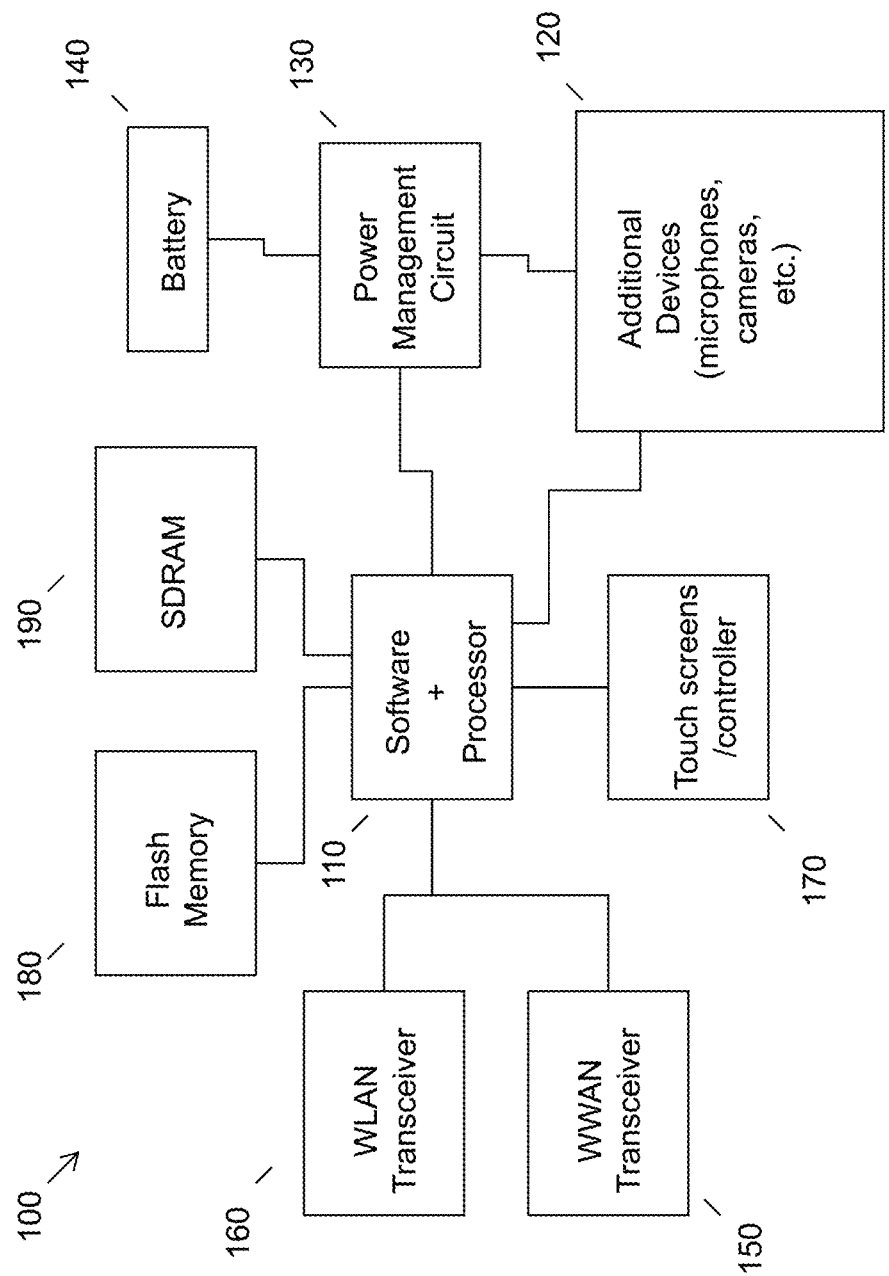
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
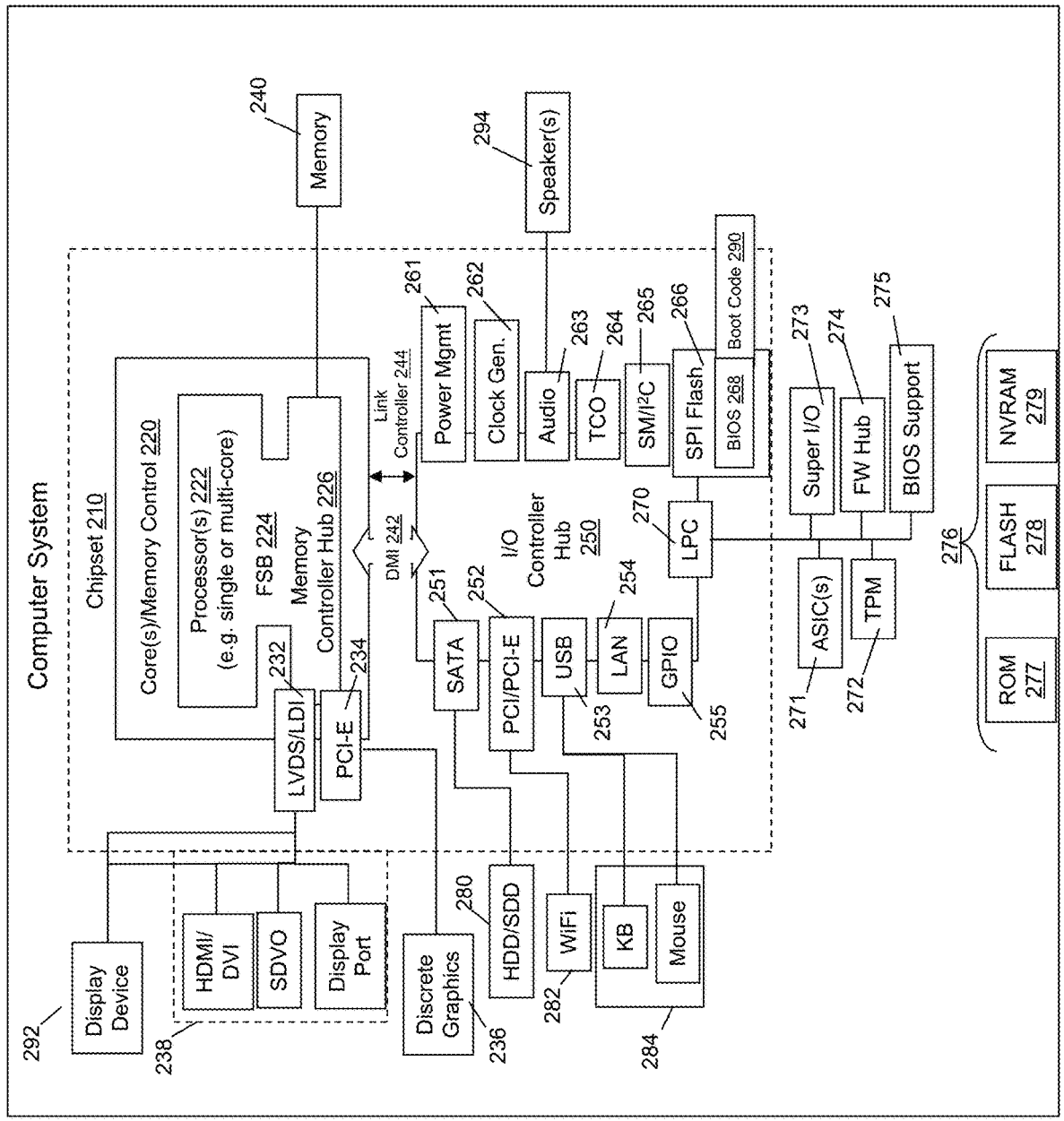
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, laptops, personal computers, and/or other electronic devices that may comprise two or more cameras and/or may be capable of displaying images and videos. For example, the circuitry outlined in FIG. 1 may be implemented in a tablet or smart phone embodiment, whereas the circuitry outlined in FIG. 2 may be implemented in a laptop.

Figure 3:
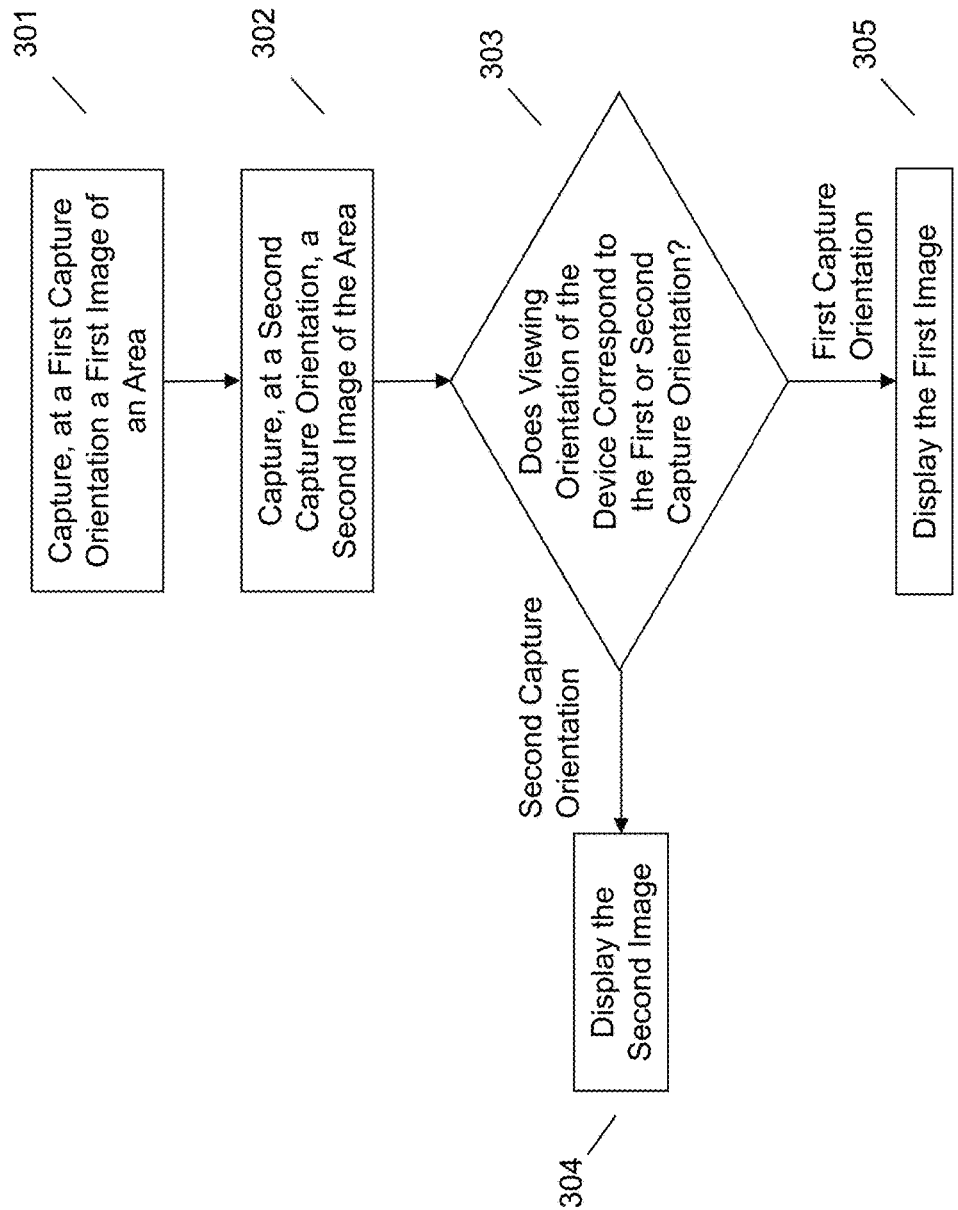
FIG. 3 illustrates an example method of providing a captured image view based on a viewing orientation of a device.

Referring now to FIG. 3, an embodiment may provide an image best suited for a current viewing orientation of the device. At 301, an embodiment may capture a first image of an area using a first camera. In the context of this application, the area may simply refer to a present field of view of the camera and may not be directed to any object or space in particular. In the context of this application, an image may refer to a static image (e.g., a picture, etc.) or a dynamic image (e.g., a video, etc.). In an embodiment, the image may be captured in response to a user command to capture. The user command may be virtually any command type (e.g., touch input, voice input, gesture input, etc.) and may be received by one or more relevant input devices (e.g., a touch-sensitive display screen, an audio capture device, an image capture device, etc.). As a non-limiting example, a user may provide touch input to a display screen of a device to depress a digital shutter button on an image capture application.

At 302, an embodiment may capture a second image of the area using a second camera. In an embodiment, the first image and the second image may be captured substantially simultaneously. More particularly, as an example, when a user provides a command to capture an image of an area, a signal may be sent to the first camera and the second camera at substantially the same time for each of the cameras to capture an image of the area.

Figure 4:
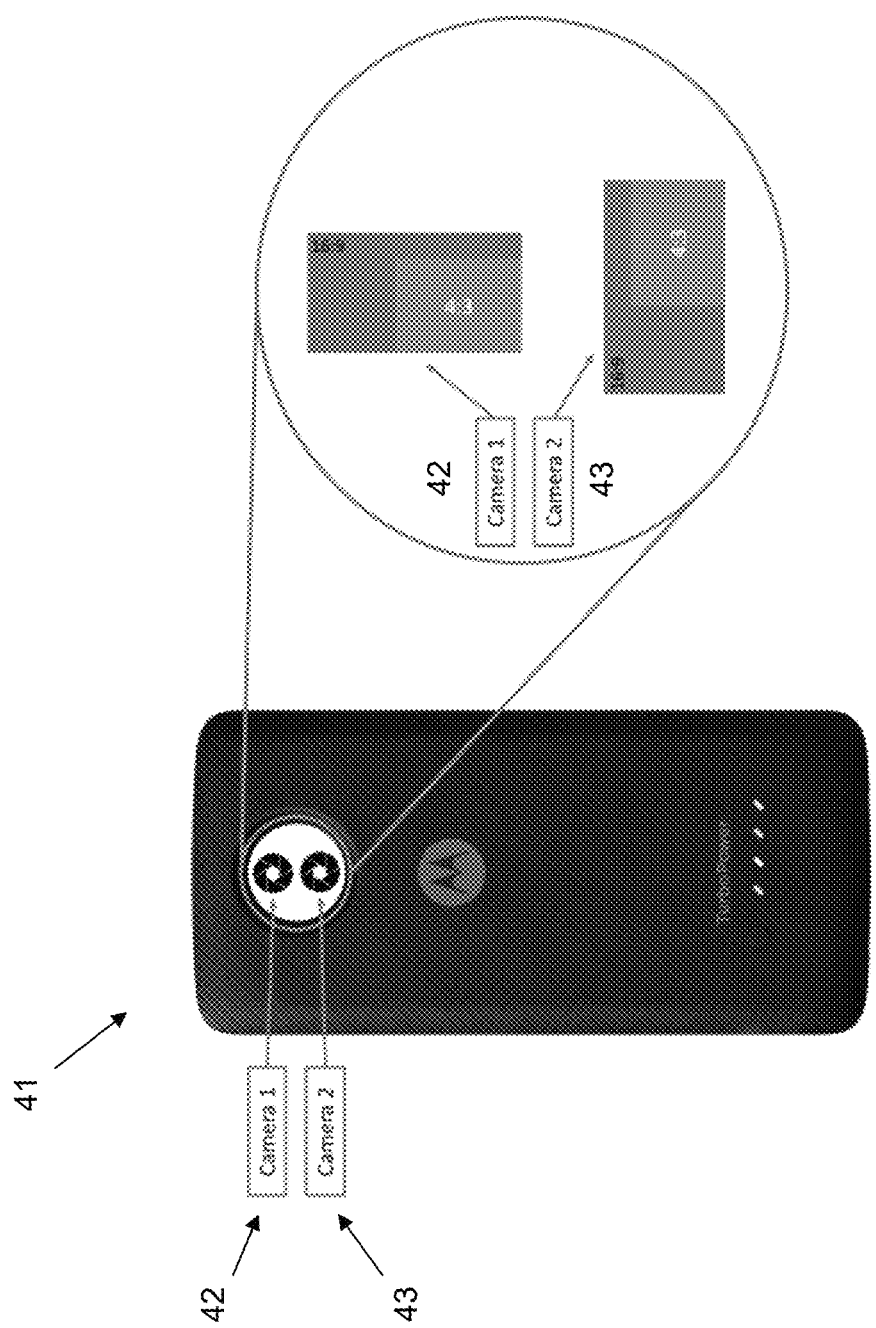
FIG. 4 illustrates an example configuration of cameras on a device according to an embodiment.

In an embodiment, the first image captured by the first camera may be associated with a first capture orientation whereas the second image captured by the second camera may be associated with a second capture orientation. In the context of this application, a capture orientation may refer to a visual mode of image capture. For example, in an embodiment, the cameras may be oriented perpendicular to one another (e.g., one camera may be vertically oriented whereas the second camera may be horizontally oriented, etc.). More particularly, and with reference to FIG. 4, a device 41 may comprise two world-view cameras, 42 and 43, located proximate to one another. In an embodiment, the first camera 42 may be oriented vertically and may be able to capture images in a portrait view whereas the second camera 43 may be oriented horizontally and may be able to capture images in a horizontal view.

In an embodiment, during capture of the first and second image, metadata may be attached to each image identifying the capture orientation that was used to capture the image. For example, an image captured by the camera having a horizontal capture orientation may comprise metadata indicating as such. This metadata may be drawn upon when determining, at 303, the version of the image that corresponds to a current viewing orientation of the device, as further described below.

Figure 5:
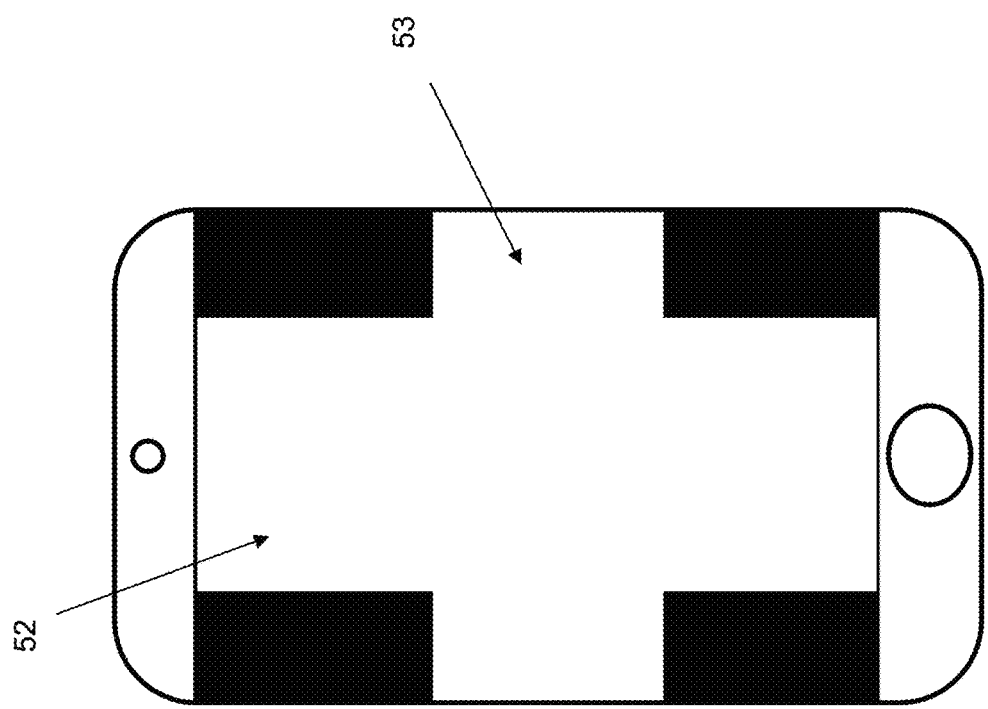
FIG. 5 illustrates an example of a combined, crosshair view according to an embodiment.

In an embodiment, during image capture, a combined preview may be displayed to the user comprising a view from the first and second camera. More particularly, the field of view from both cameras may be provided to the user on a single screen. As an example and with reference to FIG. 5, a user may be provided with a crosshair view of the fields of view from both cameras. More particularly, a view from the vertically oriented camera 52 may be provided to the user along with a view from the horizontally oriented camera 53. Such a capture configuration may provide the user with a better understanding of the scope of content that may be captured by each camera.

In an embodiment, both versions of the images captured by each of the cameras may be stored at an accessible storage location (e.g., an image library stored locally on the device, remotely on another device or server, etc.). In an embodiment, a user cycling through an image library to select an image to maximize may be provided with a preview image of both versions of the captured area or, alternatively, just a single preview image of a single version of the captured area. In the case of the latter, a user may be able to see both image versions by selecting the image of the area and thereafter toggling through a settings menu.

At 303, an embodiment may determine whether a current viewing orientation of the device corresponds to the first image or the second image. An embodiment may first determine the current viewing orientation of the device by identifying whether the viewing orientation is associated with a portrait view or a landscape view. In this regard, an embodiment may utilize one or more sensors of the device (e.g., gyroscopes, other orientation sensors, etc.) to identify an orientation of the device (e.g., is the device positioned vertically, horizontally, etc.). Additionally or alternatively, in an embodiment, the viewing orientation may involve identifying a type of device that a user is viewing the image on. More particularly, certain devices may be assigned predetermined viewing orientations. For example, all laptop and/or personal computers may be designated as horizontal viewing orientation devices.

Once the viewing orientation of the device is identified, an embodiment may determine which of the captured images to display to the user. At this point, an embodiment may utilize the metadata associated with each of the images to identify the image with the capture orientation that matches the present viewing orientation. For example, a user holding a device in a vertical orientation may want to display a captured image of an area. Responsive to receiving an indication to display the image, an embodiment may identify which of the two images associated with the area were captured using the capture orientation most similar to the present viewing orientation of the device.

Responsive to determining, at 303, that the viewing orientation of the device corresponds to the second capture orientation, an embodiment may, at 304, display the second image. Conversely, responsive to determining, at 303, that the viewing orientation of the device corresponds to the first capture orientation, an embodiment may, at 305, display the first image.

In an embodiment, if the viewing orientation of the device changes while an image is being displayed (e.g., a user rotates the device on its side, etc.), then an embodiment may display the other image associated with the area. For example, a user holding a device in portrait mode may be provided with a first image of an area that was captured by the camera having a vertical capture orientation. If the user turned their device to landscape mode, then the second image of the area that was captured by the camera having a horizontal capture orientation may be displayed.

In an embodiment, another device that did not capture the images may also be provided with the benefit described in the foregoing embodiments. For example, if an image captured by a device according to the foregoing embodiments was sent to another device, a user utilizing the other device may be presented with the version of the image that best corresponds to their current device viewing orientation. In this situation, the metadata identifying a capture orientation associated with each image may be sent to the other device along with the actual image versions in order to facilitate the image version determination process.

The various embodiments described herein thus represent a technical improvement to conventional image capturing and displaying techniques. Using the techniques described herein, an embodiment may capture two simultaneous images of an area using two cameras each comprising different capture orientations. An embodiment may then determine which capture orientation corresponds to a present viewing orientation of the device. Responsive to making this determination, an embodiment may display either the first or the second image. Such a method may allow a user to always view the most optimal image for their current viewing orientation.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    capturing, using a first camera of an information handling device, a first image of an area, wherein the first image is associated with a first capture orientation;
    capturing, using a second camera of the information handling device, a second image of the area, wherein the second image is associated with a second capture orientation;
    determining, using a processor, whether the first capture orientation or the second capture orientation corresponds to a viewing orientation of the information handling device; and
    displaying, responsive to the determining, one of the first image or the second image;
    wherein the first camera and the second camera are enabled to capture the first image and the second image irrespective of an orientation of the information handling device.

2. The method of claim 1, wherein the second camera is oriented perpendicular to the first camera.

3. The method of claim 1, wherein the first image and the second image are captured at substantially the same time.

4. The method of claim 1, wherein the first capture orientation is associated with a horizontal image of the area and wherein the second capture orientation is associated with a vertical image of the area.

5. The method of claim 4, wherein the determining comprises identifying whether the viewing orientation is associated with a landscape view or a portrait view.

6. The method of claim 5, wherein the displaying comprises displaying, responsive to identifying that the viewing orientation is associated with the landscape view, the first image.

7. The method of claim 5, wherein the displaying comprises displaying, responsive to identifying that the viewing orientation is associated with the portrait view, the second image.

8. The method of claim 1, further comprising displaying, during the capturing of the first image and the second, a combined preview of the first image of the area and the second image of the area.

9. The method of claim 8, wherein the combined preview is presented as a crosshair preview.

10. The method of claim 1, further comprising attaching, during the capturing of the first image and the second image, orientation identifying metadata to each of the first image and the second image.

11. An information handling device, comprising:
a processor;
a first camera;
a second camera;
a memory device that stores instructions executable by the processor to:
capture, using the first camera, a first image of an area, wherein the first image is associated with a first capture orientation;
capture, using the second camera, a second image of the area, wherein the second image is associated with a second capture orientation;
determine whether the first capture orientation or the second capture orientation corresponds to a viewing orientation of the information handling device; and
display, responsive to the determining, one of the first image or the second image, wherein the first camera and the second camera are enabled to capture the first image and the second image irrespective of an orientation of the information handling device.

12. The information handling device of claim 11, wherein the second camera is oriented perpendicular to the first camera.

13. The information handling device of claim 11, wherein the first image and the second image are captured at substantially the same time.

14. The information handling device of claim 11, wherein the first capture orientation is associated with a horizontal image of the area and wherein the second capture orientation is associated with a vertical image of the area.

15. The information handling device of claim 14, wherein the instructions executable by the processor to determine comprise instructions executable by the processor to identify whether the viewing orientation is associated with a landscape view or a portrait view.

16. The information handling device of claim 15, wherein the instructions executable by the processor to display comprise instructions executable by the processor to display, responsive to identifying that the viewing orientation is associated with the landscape view, the first image.

17. The information handling device of claim 15, wherein the instructions executable by the processor to display comprise instructions executable by the processor to display, responsive to identifying that the viewing orientation is associated with the portrait view, the second image.

18. The information handling device of claim 11, wherein the instructions are further executable by the processor to display, during the capturing of the first image and the second image, a combined preview of the first image of the area and the second image of the area.

19. The information handling device of claim 11, wherein the instructions are further executable by the processor to attach, during the capturing of the first image and the second image, orientation identifying metadata to each of the first image and the second image.

20. A product, comprising:
A non-transitory storage device that stores code, the code being executable by a processor and comprising:
code that instructs a first camera to capture a first image of an area, wherein the first image is associated with a first capture orientation;
code that instructs a second camera to capture a second image of the area, wherein the second image is associated with a second capture orientation;
code that determines whether the first capture orientation or the second capture orientation corresponds to a viewing orientation of an information handling device; and
code that displays, responsive to the determining, one of the first image or the second image;
wherein the first camera and the second camera are enabled to capture the first image and the second image irrespective of an orientation of the information handling device.

* * * * *